United States Patent
Ndu et al.

(10) Patent No.: US 10,896,267 B2
(45) Date of Patent: Jan. 19, 2021

(54) INPUT/OUTPUT DATA ENCRYPTION

(71) Applicant: HEWLETT PACKARD ENTERPRISE DEVELOPMENT LP, Houston, TX (US)

(72) Inventors: Geoffrey Ndu, Bristol (GB); Pratyusa K Manadhata, Princeton, NJ (US); Christopher L. Dalton, Bristol (GB); Adrian Shaw, Bristol (GB); Stuart Haber, Princeton, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 492 days.

(21) Appl. No.: 15/420,736

(22) Filed: Jan. 31, 2017

(65) Prior Publication Data

US 2018/0365451 A1 Dec. 20, 2018

(51) Int. Cl.
*G06F 21/78* (2013.01)
*H04L 9/06* (2006.01)
(Continued)

(52) U.S. Cl.
CPC .......... *G06F 21/78* (2013.01); *G06F 12/1408* (2013.01); *G06F 21/602* (2013.01);
(Continued)

(58) Field of Classification Search
None
See application file for complete search history.

(56) References Cited

U.S. PATENT DOCUMENTS

| | | | | |
|---|---|---|---|---|
| 4,558,176 A | * | 12/1985 | Arnold | G06F 21/10 380/29 |
| 5,825,878 A | * | 10/1998 | Takahashi | G06F 21/79 713/190 |

(Continued)

FOREIGN PATENT DOCUMENTS

| | | |
|---|---|---|
| CN | 104160407 A | 11/2014 |
| EP | 1802030 A1 | 6/2007 |
| TW | 201537385 A | 10/2015 |

OTHER PUBLICATIONS

Chenyu Yan et al., "Improving Cost, Performance, and Security of Memory Encryption and Authentication," Proceedings of the International Symposium on Computer Architecture, Apr. 5, 2006, pp. 1-12, USA.

(Continued)

*Primary Examiner* — Piotr Poltorak
(74) *Attorney, Agent, or Firm* — Hewlett Packard Enterprise Patent Department

(57) ABSTRACT

Examples relate to Input/Output (I/O) data encryption and decryption. In an example, an encryption/decryption engine on an Integrated Circuit (IC) of a computing device obtains at least one plaintext data. Some examples determine, by the encryption/decryption engine, whether the at least one plaintext data is to be sent to a memory in the computing device or to an I/O device. Some examples apply, when the at least one plaintext data is to be sent to the I/O device and by the encryption/decryption engine, an encryption primitive of a block cipher encryption algorithm to the at least one plaintext data to create output encrypted data, wherein an initialization vector that comprises a random number is applied to the encryption primitive.

17 Claims, 9 Drawing Sheets

(51) Int. Cl.
*G06F 12/14* (2006.01)
*G06F 21/80* (2013.01)
*G06F 21/79* (2013.01)
*G06F 21/60* (2013.01)
*G06F 21/72* (2013.01)
*G06F 21/64* (2013.01)

(52) U.S. Cl.
CPC .............. *G06F 21/72* (2013.01); *G06F 21/79* (2013.01); *G06F 21/80* (2013.01); *H04L 9/0618* (2013.01); *H04L 9/0662* (2013.01); *G06F 21/64* (2013.01); *G06F 2212/1052* (2013.01); *G06F 2212/1056* (2013.01); *G06F 2221/2129* (2013.01)

(56) References Cited

U.S. PATENT DOCUMENTS

| | | | | |
|---|---|---|---|---|
| 6,704,871 | B1* | 3/2004 | Kaplan | G06F 21/72 713/192 |
| 7,210,045 | B2* | 4/2007 | Dunstan | G06F 21/62 348/E5.006 |
| 7,472,285 | B2 | 12/2008 | Graunke et al. | |
| 7,853,752 | B1* | 12/2010 | Agarwal | G06F 12/084 711/120 |
| 8,327,187 | B1* | 12/2012 | Metcalf | G06F 12/123 714/10 |
| 8,543,838 | B1* | 9/2013 | Au | G06F 21/602 713/190 |
| 8,856,550 | B2* | 10/2014 | Nelson | G06F 11/00 380/255 |
| 8,869,235 | B2* | 10/2014 | Qureshi | G06F 21/14 726/1 |
| 8,930,713 | B2* | 1/2015 | Stufflebeam, Jr. | G06F 21/62 713/190 |
| 9,152,825 | B2 | 10/2015 | Sarcone | |
| 9,305,142 | B1* | 4/2016 | Ybarra | G06F 21/62 |
| 2002/0051536 | A1* | 5/2002 | Shirakawa | G06F 21/71 380/45 |
| 2002/0073324 | A1* | 6/2002 | Hsu | G06F 21/72 713/189 |
| 2002/0154779 | A1* | 10/2002 | Asano | G11B 20/00086 380/277 |
| 2003/0200454 | A1* | 10/2003 | Foster | G06F 21/575 726/17 |
| 2004/0088554 | A1* | 5/2004 | Kawaguchi | G06F 12/1433 713/189 |
| 2005/0125681 | A1* | 6/2005 | Bressy | G06F 21/71 713/189 |
| 2005/0278527 | A1* | 12/2005 | Liao | G06F 21/6209 713/165 |
| 2006/0015748 | A1* | 1/2006 | Goto | G06F 21/52 713/190 |
| 2006/0072762 | A1* | 4/2006 | Buer | G06F 21/72 380/277 |
| 2006/0132822 | A1* | 6/2006 | Walmsley | G06F 21/57 358/1.14 |
| 2006/0288235 | A1* | 12/2006 | Goto | G06F 21/72 713/190 |
| 2007/0067644 | A1* | 3/2007 | Flynn | G06F 12/1408 713/189 |
| 2007/0136576 | A1* | 6/2007 | Chambers | G06F 12/145 713/164 |
| 2007/0140485 | A1* | 6/2007 | Ghigo | G06F 7/584 380/46 |
| 2008/0041936 | A1* | 2/2008 | Vawter | G06Q 20/00 235/380 |
| 2008/0082836 | A1* | 4/2008 | Osaki | G06F 21/62 713/193 |
| 2009/0259857 | A1* | 10/2009 | Gehrmann | G06F 21/10 713/193 |
| 2010/0124328 | A1* | 5/2010 | Schneider | H04L 9/0618 380/42 |
| 2012/0008767 | A1* | 1/2012 | Smith | H04L 9/0631 380/28 |
| 2013/0159726 | A1 | 6/2013 | Mickeen et al. | |
| 2013/0227301 | A1* | 8/2013 | Sarcone | G06F 21/85 713/189 |
| 2013/0297948 | A1* | 11/2013 | Lee | G06F 21/602 713/193 |
| 2014/0108786 | A1* | 4/2014 | Kreft | G06F 21/71 713/156 |
| 2014/0281588 | A1* | 9/2014 | Vogan | G06F 21/79 713/193 |
| 2014/0310536 | A1 | 10/2014 | Shacham | |
| 2014/0337635 | A1* | 11/2014 | Konvalinka | H04L 63/0861 713/186 |
| 2015/0006905 | A1* | 1/2015 | Avanzi | H04L 9/0618 713/189 |
| 2015/0074426 | A1 | 3/2015 | Jean | |
| 2015/0100791 | A1* | 4/2015 | Chen | G06F 12/1408 713/189 |
| 2015/0227755 | A1* | 8/2015 | Lee | H04L 9/0863 713/165 |
| 2015/0263852 | A1* | 9/2015 | Alon | G09C 1/00 380/28 |
| 2015/0371055 | A1* | 12/2015 | Park | G06F 21/6218 713/165 |
| 2015/0371063 | A1* | 12/2015 | Van Antwerpen | G06F 21/80 713/190 |
| 2017/0024584 | A1* | 1/2017 | Chhabra | G06F 21/72 |
| 2017/0177367 | A1* | 6/2017 | DeHon | G06F 9/3867 |
| 2018/0011802 | A1 | 1/2018 | Ndu et al. | |
| 2018/0191491 | A1* | 7/2018 | Chhabra | G06F 12/08 |

OTHER PUBLICATIONS

Extended European Search Report, EP Application No. 18151583.4, dated Mar. 26, 2018, pp. 1-11, EPO.

Yang et al., "A High Speed Architecture for Galois/Counter Mode of Operation (GCM)", IACR Cryptology ePrint Archive, 2005, 15 pages.

Shay Gueron, "A Memory Encryption Engine Suitable for General Purpose Processors.", IARC eprint archive No: 2016/204, 14 pages.

Precise-ITC, Inc., "100G AES Encryption Core", available online at <https://web.archive.org/web/20170107092615/http://www2.precise-itc.com/x6/index.php/aes-gcm-100gs-core/>, Jan. 7, 2017, 2 pages, Author known.

NIST FIPS, "197: Advanced encryption standard (AES)", Federal Information Processing Standards Publication 197, Nov. 26, 2001, 51 pages, Author known.

Muller et al., "Self-encrypting disks pose self-decrypting risks.", Annual Computer Security Applications Conference (ACSAC), 2011, 10 pages.

Micron Technology, "UNVMe—A User Space NVMe Driver", available online at <https://web.archive.org/web/20180611151844/https://github.com/MicronSSD/unvme>, Jun. 11, 2018, 4 pages, Author unknown.

McGrew et al., "The Galois/counter mode of operation (GCM)", Submission to NIST Modes of Operation Process, available online at <http://csrc.nist.gov/CryptoToolkit/modes/proposedmodes/gcm/gcm-spec.pdf>, 2004, 43 pages.

Markuze et al., "True IOMMU Protection from DMA Attacks: When Copy is Faster than Zero Copy", Proceedings of the Twenty-First International Conference on Architectural Support for Programming Languages and Operating Systems, ACM, 2016, 14 pages.

M. G. Kuhn, "Cipher instruction search attack on the bus-encryption security microcontroller DS5002FP", IEEE Transactions on Computers, vol. 47, No. 10, Oct. 1998, pp. 1153-1157.

Kim et al., "NVMeDirect: A User-space I/O Framework for Application-specific Optimization on NVMe SSDs.", 8th USENIX Workshop on Hot Topics in Storage and File Systems (HotStorage 16), 2016, pp. 1-5.

(56) References Cited

OTHER PUBLICATIONS

Jonathan Corbet, "Supporting filesystems in persistent memory", available online at <http://lwn.net/Articles/610174/>, Sep. 2, 2014, 8 pages.

Boteanu et al., "Bypassing Self-Encrypting Drives (SED) in Enterprise Environments", Blackart Europe, KPMG Canada, Nov. 2, 2015, 16 pages.

Advanced Micro Devices, "Secure Encrypted Virtualization Key Management", Technical Preview, Publication # 55766, Revision: 3.01, Aug. 2016, 68 pages.

"TCG Storage Security Subsystem Class: Opal", Specification Version 2.01, Revision 1.00, Aug. 5, 2015, 80 pages, Author unknown.

"TCG Storage Security Subsystem Class: Enterprise", Specification Version 1.01, Revision 1.00, Aug. 5, 2015, 83 pages, Author unknown.

"Storage Performance Development Kit (SPDK)", available online at <https://web.archive.org/web/20161217044852/http://www.spdk.io/>, Dec. 17, 2016, 3 pages.

"NVMeDirect", Computer Systems Laboratory, available online at <https://web.archive.org/web/20180612192507/https://github.com/nvmedirect/nvmedirect>, Jun. 12, 2018, 2 pages, Author unknown.

"NVM Express Revision 1.2.1", Jun. 5, 2016, available online at <http://www.nvmexpress.org/wp-content/uploads/NVM_Express_1_2_1_Gold_20160603.pdf>, 217 pages, Author unknown.

"Intel DPDK", available online at <https://web.archive.org/web/20170102020631/http://dpdk.org/>, Jan. 2, 2017, 2 pages, Author unknown.

"Flashtec NVMe Controllers: PM8609 NVMe2032" Microsemi Corporation, available online at <https://web.archive.org/web/20161017045045/http://www.microsemi.com/products/storage/flashtec-nvme-controllers/pm8609-nvme2032>, Oct. 17, 2016, 2 pages, Author unknown.

Intel Developer Zone, "Intel® Software Guard Extensions (Intel® SGX)", Overview only, available online at <https://web.archive.org/web/20161120025329/https://software.intel.com/en-us/sgx>, Nov. 20, 2016, 4 pages.

Kaplan et al., "AMD Memory Encryption", Advanced Micro Devices, Inc., White Paper, Apr. 21, 2016, 12 pages.

* cited by examiner

INPUT/OUTPUT DATA ENCRYPTION

BACKGROUND

Security is a factor in modern computing system design. In particular, cryptographic protection of memory and storage devices is becoming valuable for computing devices to work in a reliable and trustworthy manner. Data encryption techniques may combine memory encryption and Input/Output (I/O) encryption.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
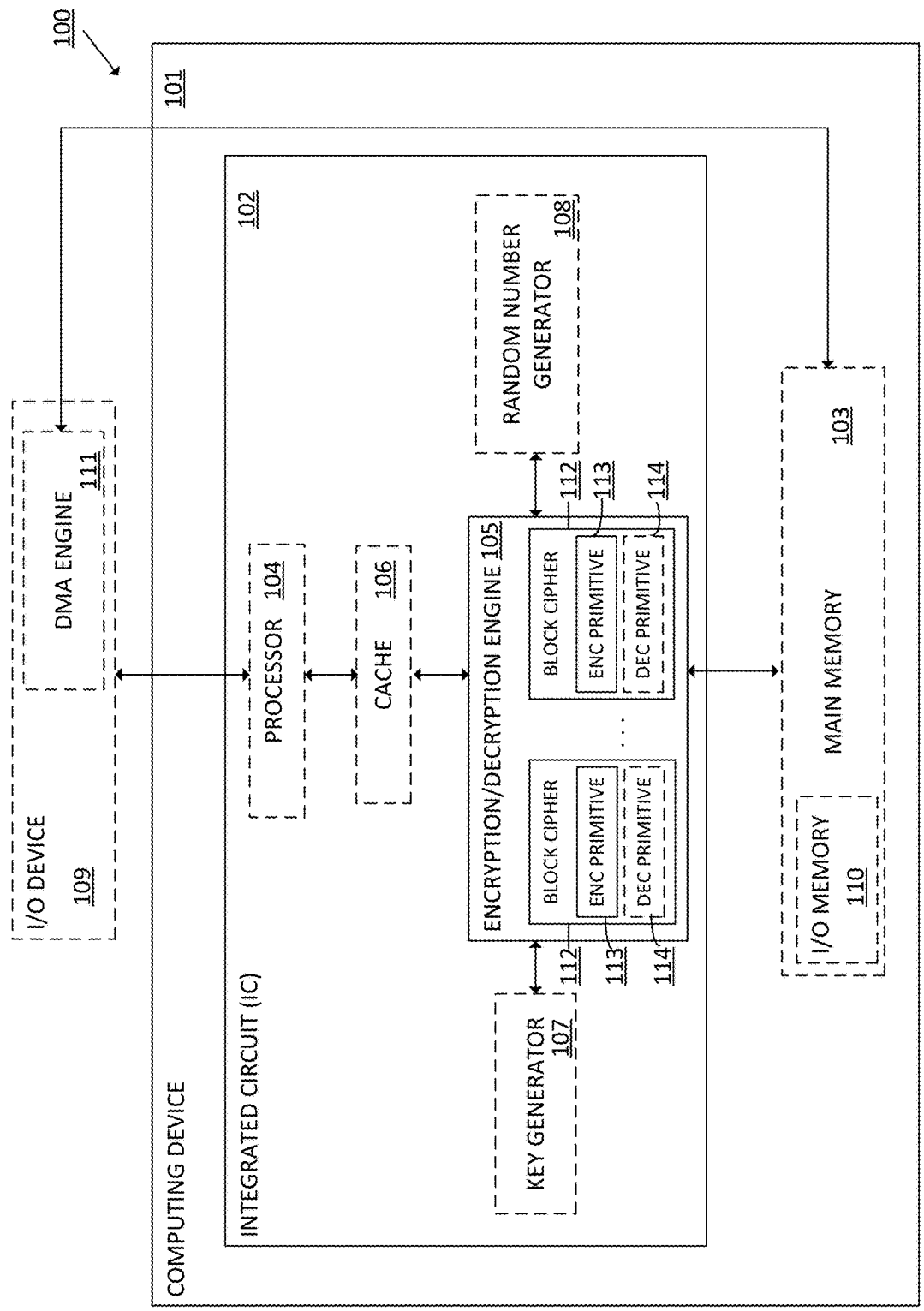
FIG. 1 is a block diagram of an example system for I/O data encryption.

Data encryption techniques may combine memory encryption and I/O encryption. Memory encryption technologies aim to protect confidentiality, integrity and replay of data stored in the main memory of computing devices. As used herein, "main memory" may refer to the physical memory that is internal to the computing device, such as Random Access Memories (RAMs), including Digital Random Access Memory (DRAM) or Static Random Access Memory (SRAM). I/O encryption technologies aim to protect the confidentiality and integrity of data in I/O devices, for example storage devices such as external mass storage devices including disk drives, flash memory devices, etc.

Integrated Circuits (ICs) may be provided with main memory encryption technologies to protect systems against a variety of attacks. ICs may be Systems-on-a-Chip (SoCs) and the ICs may be grouped into Systems-in-a-Package (SiPs). These memory encryption technologies may add a hardware encryption/decryption engine to the on-chip memory controller in the IC, which transparently encrypts data when it is written to the main memory and decrypts it when read from the main memory.

I/O devices, such as storage devices, may be provided with a built-in hardware encryption/decryption engine inside the device's controller. As used herein, "I/O device" may refer to devices connectable to a computing device with the ability to accept inputted, outputted or other processed data. I/O devices can also acquire respective media data as input sent to a computing device or send data to storage media as storage output. Some examples of I/O devices may be able to receive and store data received from the computing device, and in some cases to process the data, such as printers, screens, etc. Some other examples of I/O devices may be able to receive, process and store data received from the computing device and may be able to send data stored in the memory of the I/O device to the computing device, such as external memories (e.g., flash memories, CDs, etc.), servers, computing devices connected to the computing device implementing the encryption techniques, etc. Additionally, in I/O encryption techniques, encryption keys are stored in the I/O device instead of in the Central Processing Unit (CPU) or main memory of the computing device. Further, I/O devices may transfer data using Direct Memory Access (DMA) and at Operating System (OS) page size granularities.

However, it may be difficult for a user sending data from a computing device to an I/O device communicatively coupled to the computing device to verify that the encryption/decryption engine located in the controller of the I/O device is operating correctly, requiring the user to trust the administrator of said encryption/decryption engine. Further, the administrator may still use admin privileges to access encrypted user data, which may be of particular concern in public cloud environments where the user does not control the computing platform. Besides, encryption engines located in I/O devices may be vulnerable to physical attacks. Moreover, data may be sent from the computing device to the encryption engine of the storage controller via an unencrypted fabric/bus which may allow an unauthorized access of the data before they are encrypted.

Thus, solutions that combine memory encryption with I/O encryption use an independent memory encryption/decryption engine, usually integrated into the on-chip memory controller, for performing memory encryption/decryption and an independent I/O encryption/decryption engine, usually integrated into the on-chip controller of the I/O device, for performing I/O encryption/decryption. This increases complexity of encryption and decryption processes since two encryption/decryption(s) have to be performed. Besides, it increases costs due to duplication of the encryption/decryption infrastructure in the corresponding memory and I/O controllers.

To address these issues, examples described herein disclose a method for I/O data encryption/decryption that uses an encryption/decryption engine combining memory and I/O encryption/decryption. These examples provide combined Data-at-Rest (DAR) and Data-in-Flight (DIF) encryption by using an encryption/decryption engine located in the IC. Therefore, the IC may act as a security perimeter by encrypting data leaving the IC, whether data is going to the main memory of the computing device or to the I/O device, to prevent unauthorized accesses.

In such examples, an encryption/decryption engine on an Integrated Circuit (IC) of a computing device may obtain at least one plaintext data to be encrypted. Said plaintext data may be retrieved by a processor of the IC from a memory of the IC, e.g., a cache memory, from a main memory in the computing device, or may be generated by the processor itself upon execution of, for example, an application or a program. The encryption/decryption engine may also determine whether the obtained plaintext data is to be sent to the main memory in the computing device or to an I/O device connected to the computing device. In order to determine where the plaintext data is to be sent, the processor of the IC may mark plaintext data with a selector bit, which may be added to the physical address of plaintext data, to indicate whether the plaintext data is to be sent to the main memory or to the I/O device.

When the encryption/decryption engine determines that the plaintext data is to be sent to the I/O device, the encryption/decryption engine applies an encryption primitive of a block cipher encryption algorithm to the at least one plaintext data to create output encrypted data, wherein an Initialization Vector (IV) that comprises a random number is applied to the encryption primitive. Examples herein described may use a random number as initialization vector for data encryption/decryption. Using random numbers instead of the addresses of the data as IVs allows the encryption/decryption engine to provide security where a process/application decides to rely only on a few pages for I/O DMA operations.

In some other examples, the encryption/decryption engine may obtain encrypted data from the I/O device and may apply a decryption primitive of the block cipher encryption algorithm to the encrypted data to create output plaintext data. The IV applied to the decryption primitive may be also obtained from the I/O device and may be the same IV applied to encrypt the original plaintext data during the encrypting process.

In some examples, the encryption/decryption engine may be a multimode encryption/decryption engine and the block cipher encryption algorithm may be an authenticated block cipher encryption algorithm, such that an authentication tag is created and attached to data when encrypted. The authentication tag attached to the encrypted data ensures the integrity of the ciphertext enhancing security. In such examples, the encryption/decryption engine may perform an integrity verification of the authenticated tag attached to the encrypted data prior to perform decryption.

Referring now to the drawings, FIG. 1 is a block diagram of an example system 100 for I/O data encryption/decryption. It should be understood that the system 100 depicted in FIG. 1 may include additional components and that some of the components described herein may be removed and/or modified without departing from a scope of the system 100.

The system 100 comprises a computing device 101, having an IC 102 enabled with I/O data encryption/decryption and a main memory 103, and an I/O device communicatively coupled to the computing device 101. The IC 102 comprises a processor 104, an encryption/decryption engine 105, a key generator 107 and a random number generator 108. The processor 104 may be a Central Processing Unit (CPU), microprocessor or any other suitable hardware or software processing device. The IC 102 may further comprise a memory controller (not shown in the figure) for interfacing with main memory 103. Main memory 103 may include any volatile memory, non-volatile memory, or any suitable combination of volatile and non-volatile memory. Main memory 103 may comprise Random Access Memory (RAM), Read-Only Memory (ROM), flash memory, and/or other suitable memory. Main memory 103 may also include a random access non-volatile memory that can retain content when the power is off. Memory 103 may be used by system 100 for storing data, such as plaintext data or encrypted data. In some examples, main memory 103 comprises an I/O sub-memory 110 for storing data to be sent to the I/O device 109 or received from the I/O device 109.

Processor 104 and encryption/decryption engine 105 may have access to a cache memory 106 integrated into the IC 102. In some examples, the cache memory 106 may be part of the processor 104. Cache memory 106 may temporarily store plaintext data to be encrypted by the encryption/decryption engine 105 and data to be read by the processor 104. An address filter (not shown in the figures) may route cache lines from the cache memory 106 to the encryption/decryption engine 105 responsive to a determination that the data, page or cache line is marked as to be encrypted.

Encryption/decryption engine 105 encrypts and decrypts data (e.g., memory data, memory pages, data strings, cache lines, etc.). The encryption/decryption engine 105 may encrypt and decrypt cache lines or data blocks without encrypting and decrypting an entire memory page. The encryption/decryption engine 105 applies block cipher encryption algorithms 112 comprising encryption primitives 113 and decryption primitives 114 to particular data according to, for example one-way hash functions, encryption/decryption protocols or functions that the primitives may store. The block cipher encryption algorithms, as used herein, are implemented as instructions encoded to a machine readable medium. The block cipher encryption algorithms 112 are algorithms operating on fixed-length groups of bits, called blocks, with an unvarying transformation that is specified by an encryption/decryption key. The encryption primitive 113 is the encryption element (e.g. the smallest granular encryption element) to encrypt specific data. The decryption primitive 114 is the decryption element (e.g. the smallest granular decryption element) to decrypt specific data. Various encryption and decryption primitives for encryption/decryption may be used in different implementations. In some examples, the encryption/decryption engine 105 may be implemented in the memory controller of the main memory 103.

The encryption/decryption engine 105 uses an encryption/decryption key that determines a functional output of the respective encryption/decryption primitives 113,114. The IC 102 further comprises a key generator 107, communicatively coupled to the encryption/decryption engine 105, to generate the encryption/decryption key. The key generator 107 may be a processor with external seed such as, for example, a user password and/or fingerprints. After the key is generated, the encryption/decryption key may be stored in a long-term key store, which may be a secure, separate memory (not shown in the figure) in the IC 102 or may be part of the main memory 103. In some other examples, the key store may comprise a set of page tables that map physical memory addresses to encryption/decryption keys. The key store may also contain metadata such as Address Space Identifiers (ASID), permission bits, etc.

The IC 102 also comprises a random number generator 108 communicatively coupled to the encryption/decryption engine 105. The random number engine 108 generates a random number that is used by the encryption/decryption engine 105 to create an IV as an input for the block cipher encryption algorithms 112.

The random number generator 108 may comprise a True Random Number Generator (TRNG) to generate a random seed and a Pseudo Random Number Generator (PRNG) to periodically receive the random seed from the TRNG and to generate the random number based on the random seed. In some examples, the random number generator 108 may further comprise a counter to count the number of encryptions performed, such that, upon reaching a pre-defined number of encryptions, the TRNG may generate a new seed to be sent to the PRNG. For example, it may be established that the PRNG is to be reseeded by the TRNG after 10,000 encryptions. In such example, as the count increments per encryption operation, once the counter has reached 10,000 encryptions, it may trigger the TRNG to reseed the PRNG to generate pseudo random numbers. A linear-feedback shift register (LSRF) may be used as a counter because of its straightforward and efficient construction from simple logic circuits, long periods, and uniformly distributed output.

The random number generated by the random number generator 108 may not be the same length as the data blocks encrypted by the block cipher encryption algorithm. Generating random numbers shorter than data blocks allows using random number generators 108 with small width. For example, a 128-bit IV may be securely constructed from 64 bit random number by appending to this number 64 zero-bits.

The I/O device 109 has a DMA engine 111 that allows the I/O device 109 to copy data to/from the main memory 103 without involving the processor 104 of the IC 102. In some examples, read or write requests from the I/O device 109 may not lead to the decryption or encryption of pages in I/O memory 110. Encrypted data in I/O memory 110 may be decrypted by the encryption/decryption engine 105 when read by the processor 104 and plaintext data may be encrypted when written by the processor 104.

I/O memory 110 stores encrypted data. In some examples, the IVs used for encrypting data may be stored with the encrypted data. A page in I/O memory 110 may be generated in response to storage of the encrypted data. The generated page may comprise a data subpage storing the encrypted data and a metadata subpage storing the respective initialization vector and other metadata, such as authenticated tags, etc. Thus, a page in the I/O memory 110 would be twice the size of a normal page.

In some examples, the encryption/decryption engine 105 may be a multimode encryption/decryption engine and the block cipher encryption algorithm 112 may be an authenticated block cipher encryption algorithm, such that an authentication tag is created and attached to data when encrypted. In such examples, the metadata subpage may also store the corresponding authentication tag.

Encryption/decryption engine 105 and DMA engine 111 may be any combination of hardware and programming to implement the functionalities of the engines described herein. In examples described herein, such combinations of hardware and programming may be implemented in a number of different ways. For example, the programming for engines may be processor executable instructions stored on at least one non-transitory machine-readable storage medium and the hardware for engines may include at least one processor to execute those instructions. In some examples, the at least one machine-readable storage medium may store instructions that, when executed by the at least one processing resource, at least partially implement the engine(s). In examples described herein, multiple engines may be collectively implemented by a combination of hardware and programming, as described above. In other examples, the functionalities of encryption/decryption engine 105 and DMA engine 111 may be at least partially implemented in the form of electronic circuitry. In other examples, the functionalities of encryption/decryption engine 105 and DMA engine 111 may be completely implemented in the form of hardware or electronic circuitry.

Figure 2:
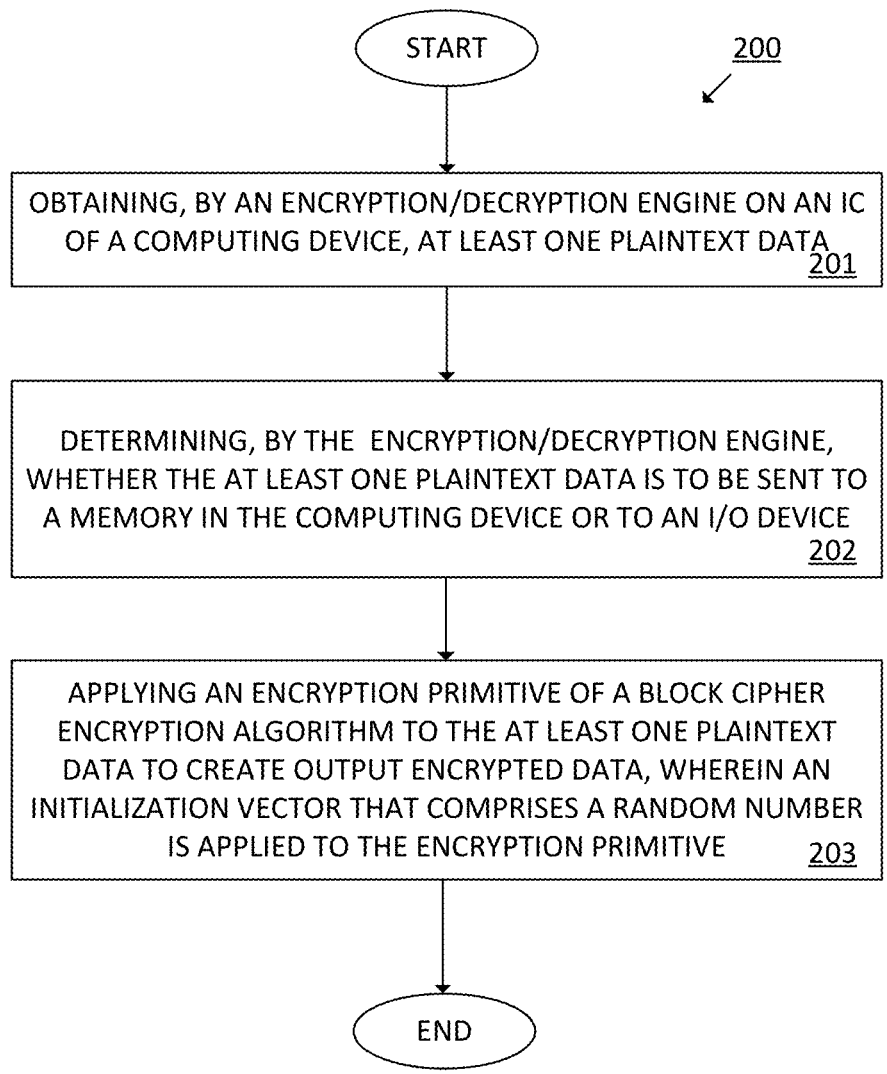
FIG. 2 is a flowchart of an example method for I/O data encryption/decryption.

FIG. 2 is a flowchart of an example method 200 for I/O data encryption. Although execution of method 200 is described below with reference to the system 100 of FIG. 1, other suitable systems for the execution of method 200 may be utilized. Additionally, implementation of method 200 is not limited to such examples.

At block 201 of method 200, the encryption/decryption engine 105 of the IC 102 of the computing device 101 obtains plaintext data. The plaintext data obtained by the encryption/decryption engine 105 may be received from the processor 104 of the IC 102 from an internal device, such as the main memory 103, an external device, such as an I/O device or others external storage devices, may be at least part of a cache line received from the cache memory 106, etc., or may be data generated by the processor 104 itself.

Then, at block 202 of method 200, the encryption/decryption engine 105 determines whether the plaintext data is to be sent to the main memory 103 or to the I/O device 109. The determination may be based on a bit in the plaintext data that indicates whether the at least one plaintext data is to be sent and store in the main memory 103 or to be sent to the I/O device 109. The selector bit may be previously added to the plaintext data by the processor 104. In some other examples, the processor 104 may provide the data to be sent to the I/O device 109 with a particular known address in main memory 103, that is designated as going to the I/O device 109, to the encryption/decryption engine 105, so the encryption/decryption engine 105 may know that the data is to be sent to the I/O device 109 based on the known address. In some other examples, this particular known address may belong to the I/O memory 110 in the main memory 103.

At block 203 of method 200, the encryption/decryption engine 105, responsive to a determination that, for example, the value of the selector bit indicates that the plaintext data is to be sent to the I/O device 109, applies the encryption primitive 113 of a block cipher encryption algorithm 112 to the plaintext data to create output encrypted data, wherein an initialization vector that comprises a random number is applied to the encryption primitive 113. The encryption primitive 113 and the block cipher encryption algorithm 112 used may depend on the different implementations. The created output encrypted data is data leaving the IC boundary.

The encryption/encryption engine 105 may use the same or a different encryption primitive for encrypting data to be sent to the I/O device 109 or to the main memory 103. Similarly, the encryption/encryption engine 105 may use the same or a different decryption primitive for decrypting data coming from the I/O device 109 and from the main memory 103.

Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1 and 3-8.

Figure 3:
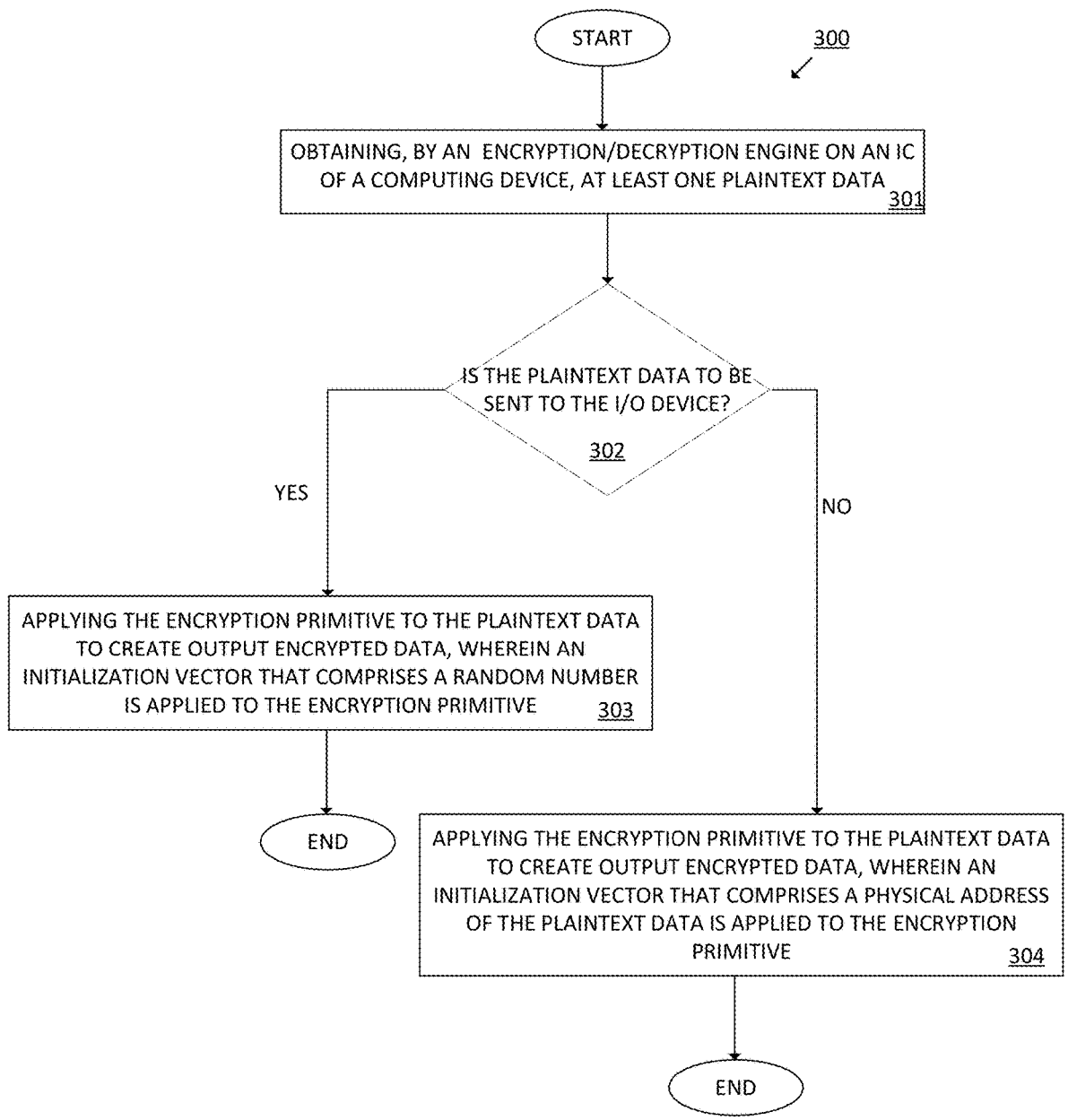
FIG. 3 is a flowchart of another example method for I/O data encryption, including encrypting data that is to be sent and stored in the main memory of the computing device.

FIG. 3 is a flowchart of an example method 300 for I/O data encryption, including encrypting data that is sent and stored in the main memory of the computing device. Although execution of method 300 is described below with reference to the system 100 of FIG. 1, other suitable systems for the execution of method 300 may be utilized. Additionally, implementation of method 300 is not limited to such examples.

At block 301 of method 300, the encryption/decryption engine 105 obtains plaintext data. Then, at block 302 of method 300, the encryption/decryption engine 105 determines whether the at least one plaintext data is to be sent and stored in the main memory 103 or to be sent the I/O device 109 based on, for example, the particular known address established by the processor 104 for the plaintext data. At block 303 of method 300, if the encryption/decryption engine 105 determines that the plaintext data is to be sent to the I/O device 109, the encryption/decryption engine 105 applies the encryption primitive 113 of the block cipher encryption algorithm 112 to the plaintext data to create output encrypted data, wherein an initialization vector that comprises a random number is applied to the encryption primitive 113. The encryption/decryption engine 105 determines that the plaintext data is to be sent to the I/O device 109 because the particular known address is an address of the I/O memory 110.

At block 304 of method 300, the encryption/decryption engine 105 determines that the plaintext data is to be sent to the main memory 103, so the encryption/decryption engine 105 applies the encryption primitive 113 of the block cipher encryption algorithm 112 to the plaintext data to create output encrypted data, wherein an initialization vector that comprises a physical address of the data stored in I/O memory 110 is applied to the encryption primitive 113. The encryption/decryption engine 105 determines that the plaintext data is to be stored in the main memory because the particular known address is an address of the main memory 103 other than those addresses of the I/O memory 110.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1, 2 and 4-8.

Figure 4:
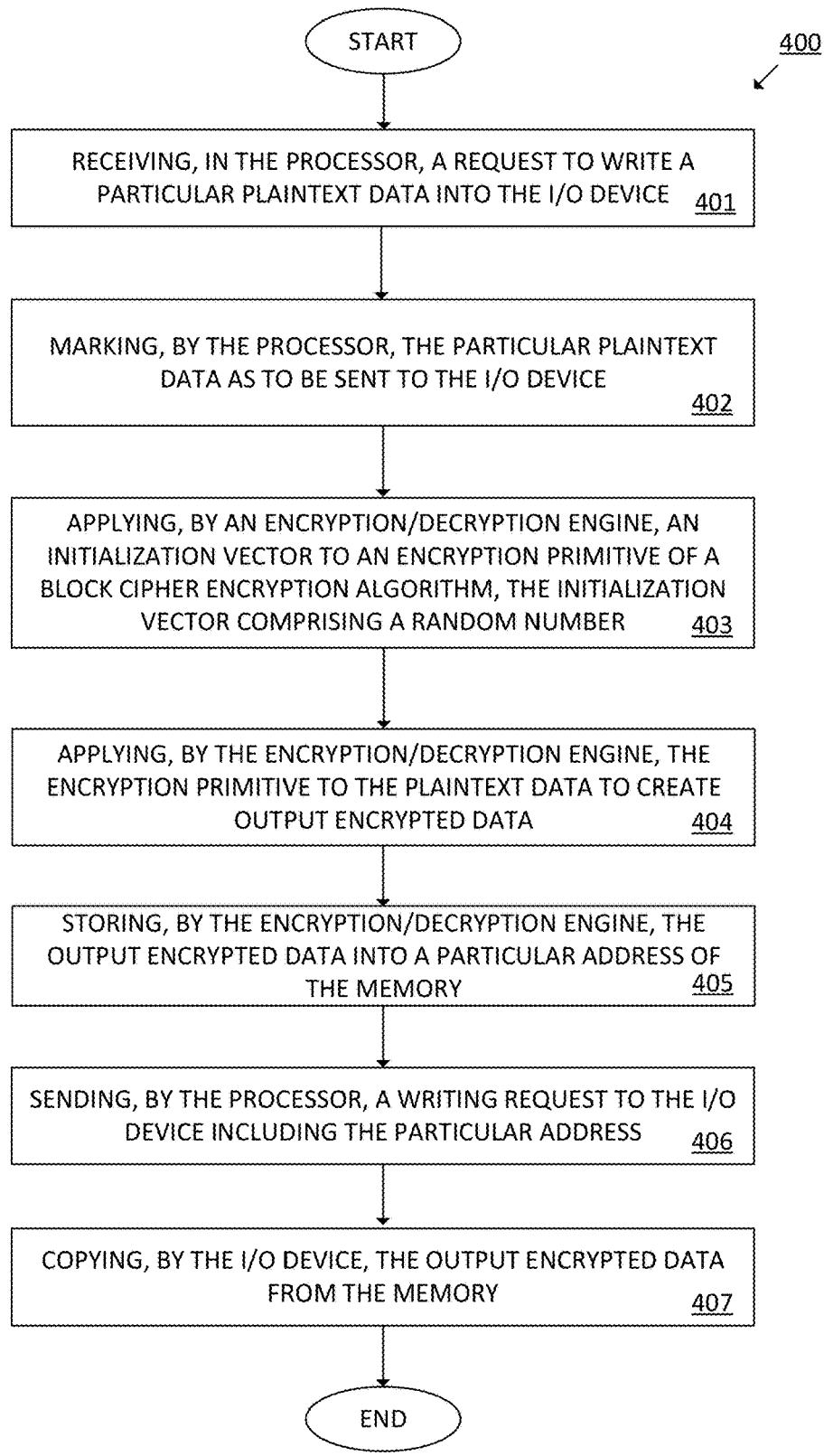
FIG. 4 is a flowchart of another example method for I/O data encryption, including receiving in a processor of an Integrated Circuit (IC) a request to write plaintext data into an I/O device.

FIG. 4 is a flowchart of an example method 400 for data encryption, including receiving in the processor of the IC a request to write plaintext data into an I/O device. Although execution of method 400 is described below with reference to the system 100 of FIG. 1, other suitable systems for the execution of method 400 may be utilized. Additionally, implementation of method 400 is not limited to such examples.

At block 401 of method 400, the processor 104 receives a request to write a particular plaintext data into an I/O device 109 communicatively coupled to the computing device 101. At block 402 of method 400, the processor 104 marks the particular plaintext data as to be sent to the I/O device by adding a selector bit to the plaintext data, the selector bit having a value of "1". A value of "0" in the selector bit would mean that the plaintext data is to be sent and stored in the main memory 103 for, for example, normal program execution. After that, the processor 104 may send the particular plaintext data to the encryption/decryption engine 05 through the cache memory 106.

At block 403 of method 400 and once the encryption/decryption engine 105 has previously determined that the particular plaintext data is to be sent to the I/O device 109 based on the selector bit, the encryption/decryption engine 105 applies an IV to the encryption primitive 113 of a block cipher encryption/decryption algorithm 112 wherein the IV comprises a random number. The random number is generated by the random number generator 108 and is different for each encryption to guarantee uniqueness. Then, at block 404 of method 400, the encryption/decryption engine 105 applies the encryption primitive 113 to the plaintext data to create output encrypted data. The encryption primitives, and thus the block cipher encryption algorithms, may vary depending on different implementations.

At block 405 of method 400, the encryption/decryption engine 105 stores the output encrypted data into a particular address of the main memory 103. In some examples, the particular address may be an address in main memory 103 previously established as an address storing data to be sent to the I/O device 109. In other examples, the particular address may be part of the I/O memory 110. Once the encryption/decryption engine 105 has stored the output encrypted data in the main memory 103, the encryption/decryption engine 105 may inform, for example by sending an acknowledgement, the processor 104 that the encrypted data is ready to be read by the I/O device 109.

At block 406 of method 400, the processor 104 sends a writing request to the I/O device 109 including the particular address in the main memory 103 in which the encrypted data is stored. At block 407 of method 400 and in response to the reception of the writing request in the I/O device 109, the DMA engine 110 of the I/O device 109 reads and copies the encrypted data from the main memory 103. In some examples this data may be stored in a memory attached to the I/O device such as flash memories, Electrically Erasable Programmable Read-Only Memory (EEPROM), etc.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3, 5A, 5B, and 6-8.

Figure 5B:
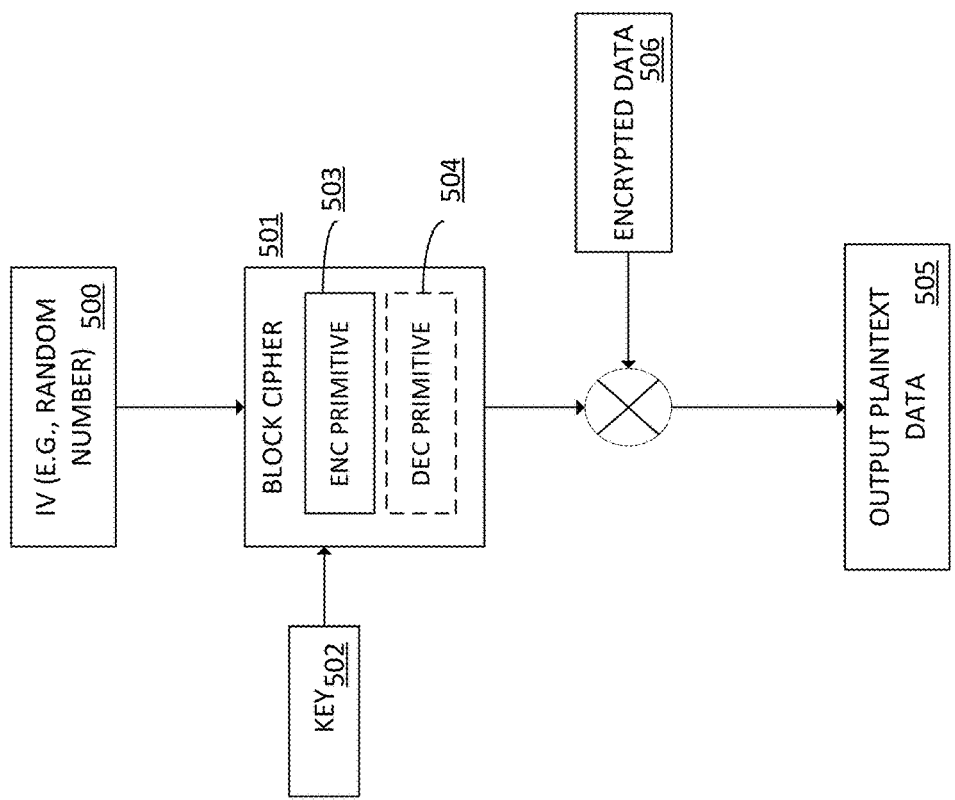
FIG. 5B is a block diagram of an example decryption process of encrypted data coming from the I/O device.
Figure 5A:
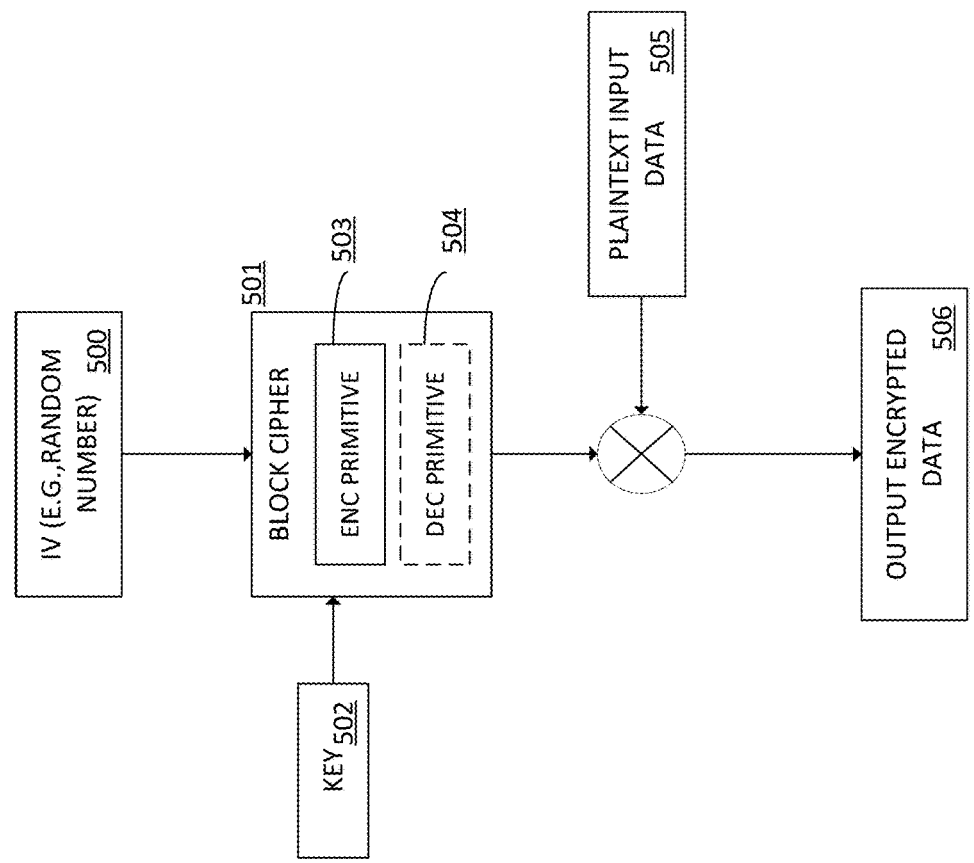
FIG. 5A is a block diagram of an example encryption process of the plaintext data to be sent to the I/O device.

FIG. 5A is a block diagram of an example encryption process of the plaintext data to be sent to the I/O device. It should be understood that the diagram of FIG. 5A may include additional components and that some of the components described herein may be removed and/or modified without departing from a scope of the described encryption process.

The block cipher encryption algorithm 501 receives a random number 500 as the initialization vector and an encryption/decryption key 502 that are applied to the encryption primitive 503 stored in the block cipher encryption algorithm 501. The IV 500 and the encryption/decryption key 502 determine the functional output of the encryption primitive 503. The plaintext input data 506 encrypted by the block cipher algorithm 501 is a data block of a predefined size, for example, 32, 64, 128, etc., bits. The output encrypted data 506 may be a data block of the same length than the plaintext input data block 505.

FIG. 5B is a block diagram of an example decryption process of encrypted data coming from the I/O device. It should be understood that the diagram of FIG. 5B may include additional components and that some of the components described herein may be removed and/or modified without departing from a scope of the described decryption process.

The block cipher encryption algorithm 501 receives the random number 500, which was used in the encryption process, as the IV for a specific encrypted data block. The block cipher encryption algorithm 501 also receives the encryption/decryption key 502 that was used in the encryption process (e.g., FIG. 5A). The received random number 500 and the encryption/decryption key 502 are applied to the decryption primitive 504 stored in the block cipher encryption algorithm 501. The IV 500 and the encryption/decryption key 502 determine the functional output of the decryption primitive 504. The output plaintext data 505, obtained as a result of applying the decryption primitive 504 to the encrypted data 506 (corresponding to the output encrypted data of FIG. 5A), is the original plaintext input data 505 of FIG. 5A.

The processes for encrypting and decrypting data to be stored in the main memory 103 may be the same processes of FIGS. 5A and 5B but using the physical address of the plaintext data in memory as the IV for the encryption and decryption processes.

Figure 6:
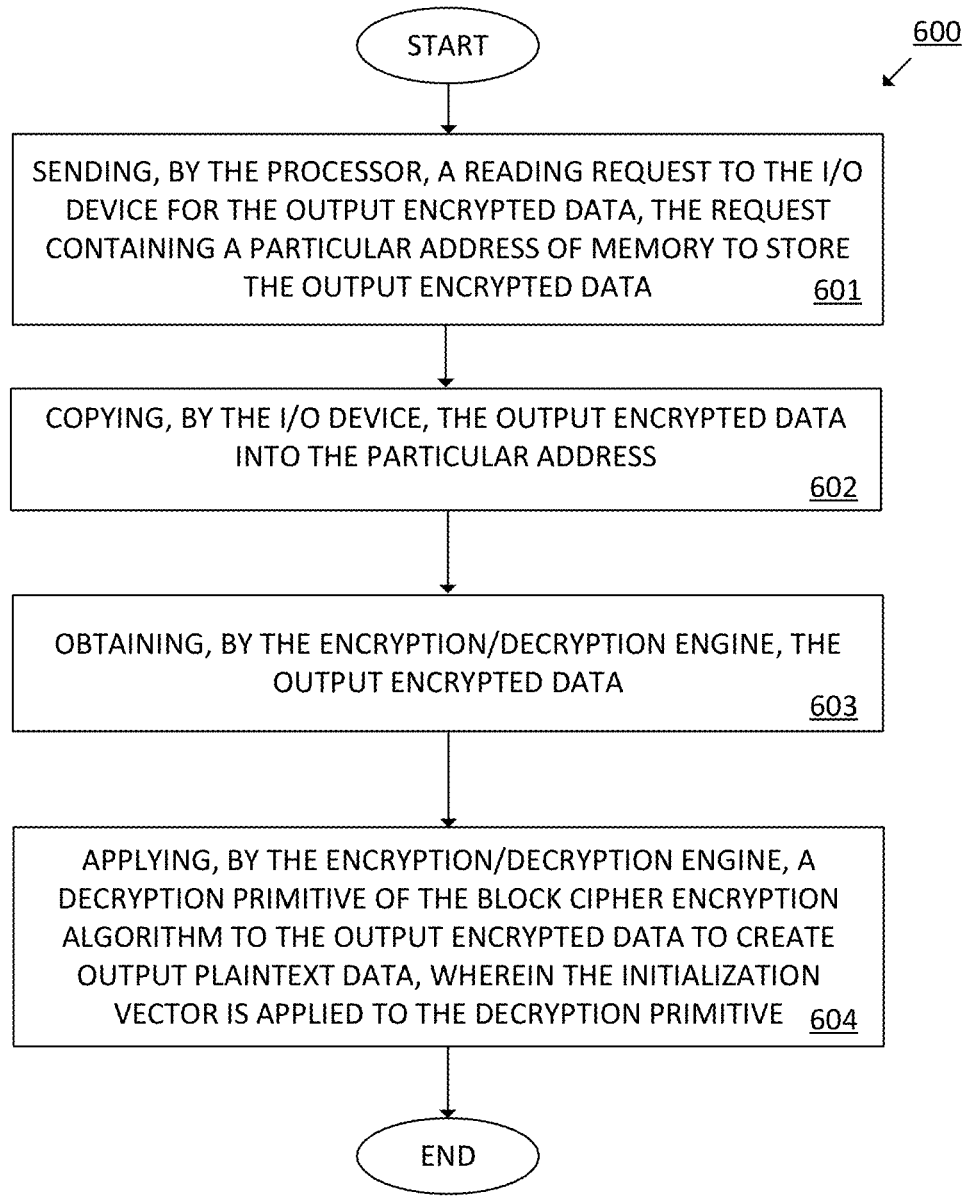
FIG. 6 is a flowchart of an example method for I/O data decryption.

FIG. 6 is a flowchart of an example method 600 for I/O data decryption. Although execution of method 600 is described below with reference to the system 100 of FIG. 1, other suitable systems for the execution of method 600 may be utilized. Additionally, implementation of method 600 is not limited to such examples.

At block 601 of method 600, the processor 104 of the IC 102 sends a reading request to the I/O device 109 for a particular encrypted data that had been previously encrypted by the computing device 101. The reading request contains a particular address of main memory 103 to store the output encrypted data. At block 602 of method 600 and in response to reception of the reading request in the I/O device 109, the DMA engine 111 stores the requested encrypted data into the particular address in main memory 103 together with the IV used in the encryption process.

Then, at block 603 of method 600, the encryption/decryption engine 105 obtains the encrypted data from the main memory 103 and decrypts the encrypted data by applying the corresponding decryption primitive 114 of the block cipher encryption algorithm 112 to the encrypted data to create output plaintext data, wherein the IV is applied to the decryption primitive. In some examples, the encryption/decryption engine 105 may send the obtained plaintext data to the processor 104 through the cache memory 106 or may store the plaintext data in the main memory 103 so the processor 104 may access to said data when appropriate.

Although the flowchart of FIG. 6 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-4, 5A, 5B, 7 and 8.

Figure 7:
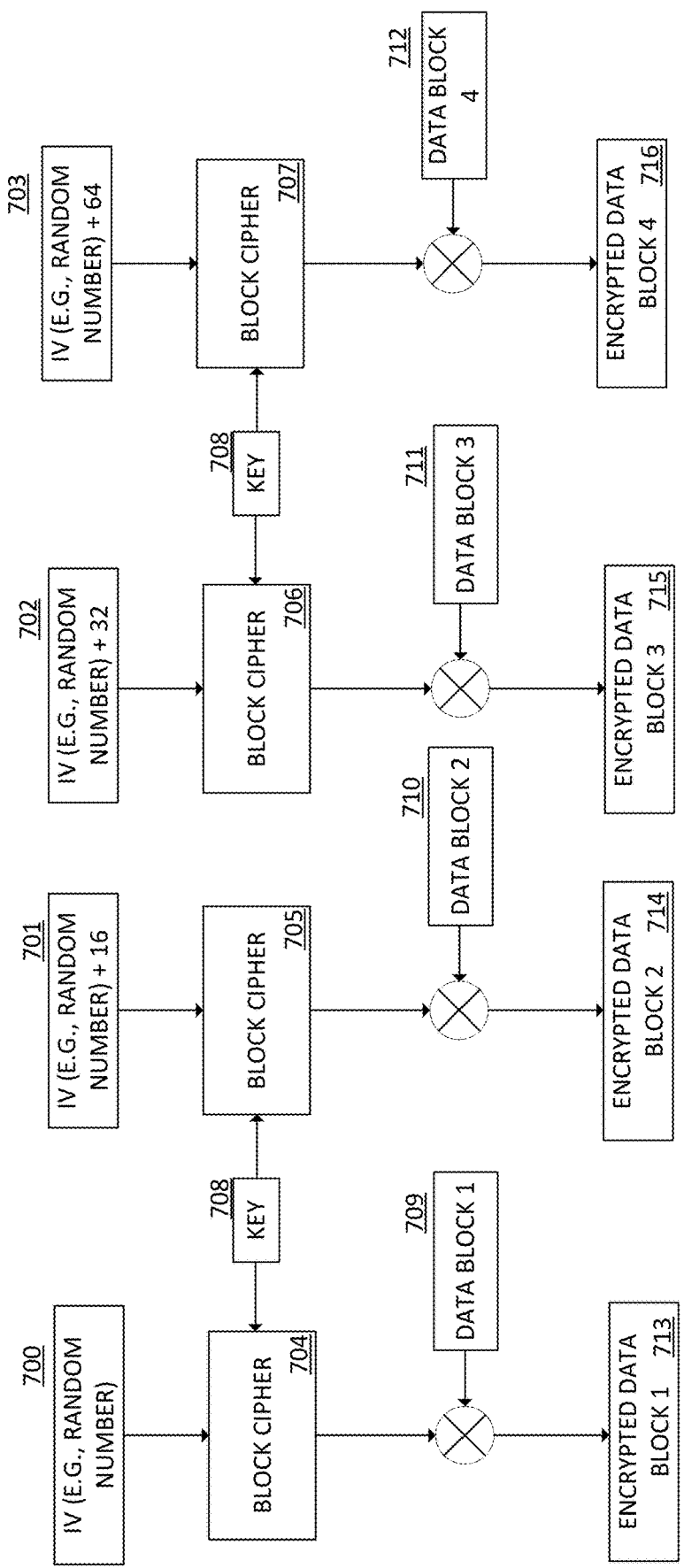
FIG. 7 is a block diagram of an example encryption process of a plaintext cache line to be sent to the I/O device.

FIG. 7 is a block diagram of an example encryption process of a plaintext cache line to be sent to the I/O device. It should be understood that the diagram of FIG. 7 may include additional components and that some of the components described herein may be removed and/or modified without departing from a scope of the described decryption process.

As depicted in FIG. 7, a 64-byte data cache line of plaintext data is split into four 16-byte data blocks 709-712 that are encrypted in parallel by means of 4 identical block cipher encryption algorithms 704-707 and one encryption key 708 used for determining the functional output of the encryption primitive of the block ciphers 704-707. In order to assure the uniqueness of the encryption of each one of the four data blocks 709-712, a number corresponding to the size of the block is added to the random number used as the IV 700-703 for the corresponding block cipher encryption algorithms 704-707. For example, the IVs used may be a "random number" 700 for the first block cipher encryption algorithm 704, a "random number+16" 701 for the second block cipher encryption algorithm 705, a "random number+32" 703 for the third block cipher encryption algorithm 706 and a "random number+64" 703 for the fourth block cipher encryption algorithm 707. In some other examples, if the block cipher encryption algorithms used need splitting data into, for example, 18-byte blocks then the numbers added to the random number would change. The results of applying the IVs 700-703 and the encryption key 708 to the corresponding block cipher encryption algorithms 704-707 that, in turn, are applied to the corresponding data blocks 709-712 are encrypted data blocks 713-716.

In some examples, the size of the cache line may be different such as 32-bytes, 128-bytes, 256-bytes, etc. In some other examples, multiple block cipher encryption algorithms in the encryption/decryption engine may be used to encrypt multiple cache lines or a part of a cache at a time.

Figure 8:
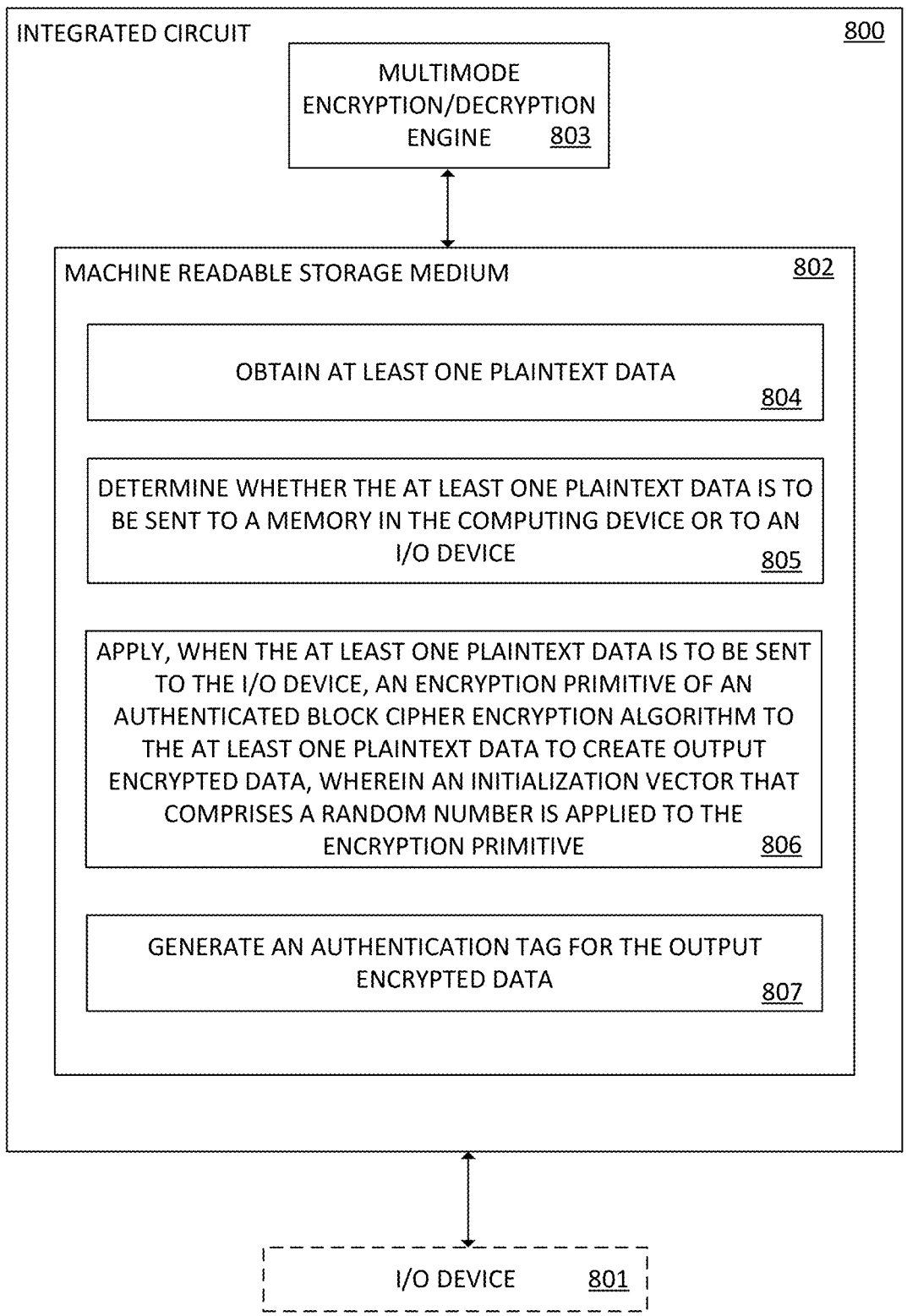
FIG. 8 is a block diagram of an example Integrated Circuit for I/O data encryption.

FIG. 8 is a block diagram of an example Integrated Circuit for I/O data encryption. It should be understood that the diagram of FIG. 8 may include additional components and that some of the components described herein may be removed and/or modified without departing from a scope of the described decryption process. Additionally, implementation of IC 800 is not limited to such examples.

The Integrated Circuit 800 is depicted as including a multimode encryption/decryption engine 803 and a machine-readable storage medium 802. An I/O device 801 is depicted as being communicatively coupled to the IC 803.

The multimode encryption/decryption engine 803 executes instructions 804 to obtain at least one plaintext data from, for example, a processing resource in the IC 800. The multimode encryption/decryption engine 803 further executes instructions 805 to determine whether the at least one plaintext data is to be sent and stored in the main memory of the computing device or is to be sent to the I/O device 801. Determination that the plaintext data is to be sent to the I/O device may be based on the physical address in main memory in which the plaintext data, once encrypted, is going to be temporarily stored until the DMA engine in the I/O device 801 read the encrypted data.

The multimode encryption/decryption engine 803 executes instructions 806 to apply, when the at least one plaintext data is to be sent to the I/O device 801, an encryption primitive of an authenticated block cipher encryption algorithm to the at least one plaintext data to create output encrypted data, wherein an initialization vector that comprises a random number is applied to the encryption primitive. The encryption/decryption engine 803 also executes instructions 807 to generate an authentication tag for the output encrypted data.

The encryption/decryption engine 803 may include a processing resource that may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The encryption/decryption engine 803 may fetch, decode, and execute instructions stored on machine-readable storage medium 802 to perform the functionalities described above in relation to instructions 804-807. In other examples, the functionalities of any of the instructions of machine-readable storage medium 802 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution.

Figure 9:
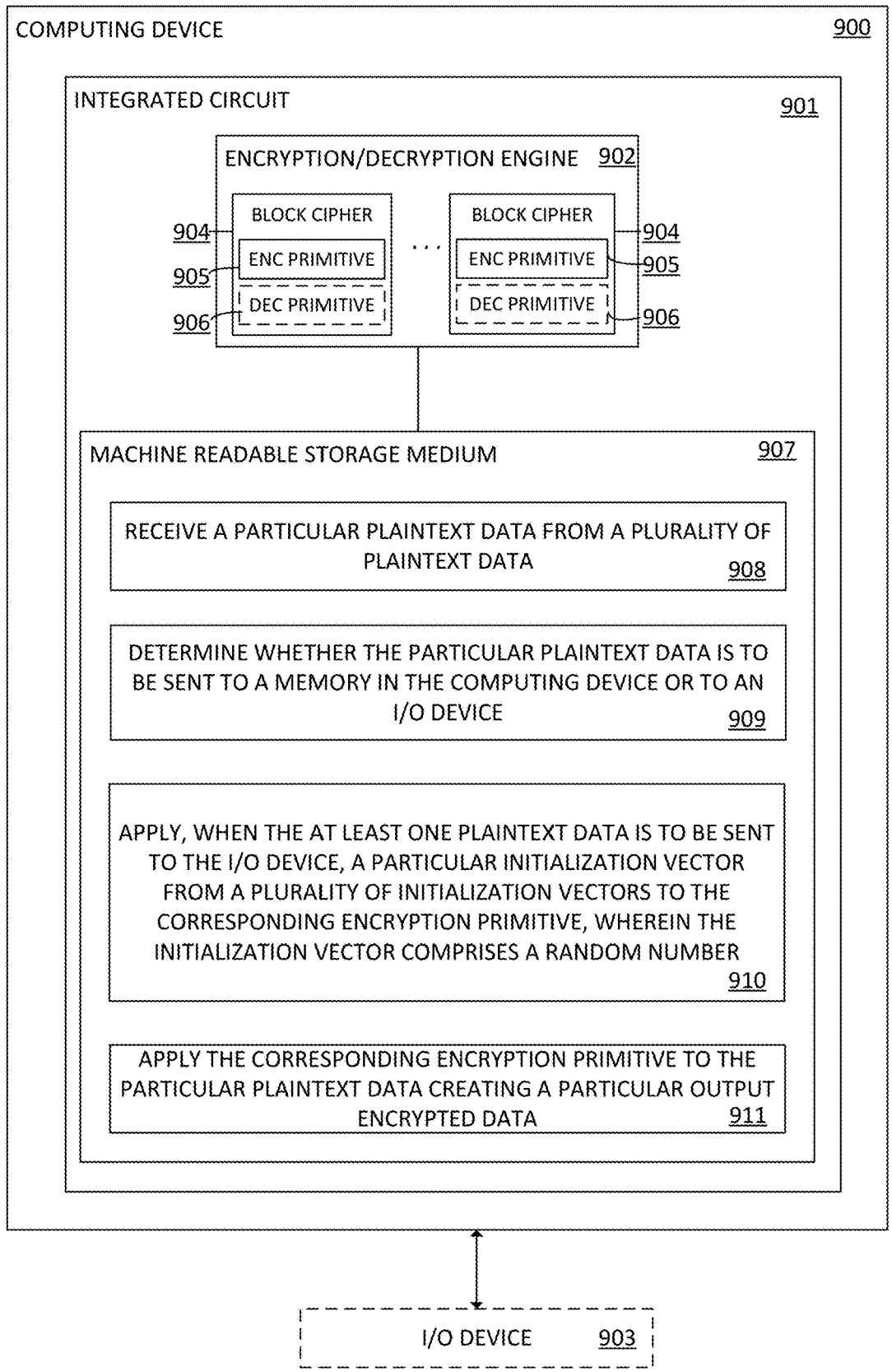
FIG. 9 is a block diagram of another example Integrated Circuit for I/O data encryption, including a plurality of block cipher encryption algorithms.

FIG. 9 is a block diagram of another example Integrated Circuit for I/O data encryption, including a plurality of block cipher encryption algorithms. It should be understood that the diagram of FIG. 9 may include additional components and that some of the components described herein may be removed and/or modified without departing from a scope of the described decryption process. Additionally, implementation of IC 901 is not limited to such examples.

The IC 901 is depicted as being comprised in a computing device 900 and includes an encryption/decryption engine 902 and a machine-readable storage medium 907. The encryption/decryption engine 902 comprises a plurality of block cipher encryption algorithms 904 and each block cipher encryption algorithm comprises an encryption primitive 905 and may further comprises a decryption primitive 906. An I/O device 903 is depicted as being communicatively coupled to the computing device 900.

The encryption/decryption engine 902 executes instructions 908 to obtain at receive a particular plaintext data from a plurality of plaintext data. The encryption/decryption engine 902 further executes instructions 909 to determine whether the particular plaintext data is to be sent to a memory in the computing device or to the I/O device 903. Determination that the plaintext data is to be sent to the I/O device 903 may be based on the physical address in main memory in which the plaintext data, once encrypted, is going to be temporarily stored until a DMA engine in the I/O device 903 read the encrypted data.

The encryption/decryption engine 902 executes instructions 910 to apply, when the at least one plaintext data is to be sent to the I/O device 903, a particular initialization vector from a plurality of initialization vectors to the corresponding encryption primitive, wherein the initialization vector comprises a random number. The encryption/decryption engine 902 also executes instructions 911 to apply the corresponding encryption primitive to the particular plaintext data creating a particular output encrypted data.

The encryption/decryption engine 902 may include a processing resource that may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The encryption/decryption engine 902 may fetch, decode, and execute instructions stored on machine-readable storage medium 907 to perform the functionalities described above in relation to instructions 908-911. In other examples, the functionalities of any of the instructions of machine-readable storage medium 907 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Encrypting and decrypting I/O data as described herein may be useful for reducing latency of I/O operations as there is no need of an encryption engine in the controller of the I/O device. It further simplifies encryption/decryption key management since data leaving the IC of the computing device is encrypted once by default, and thus, the same encryption/decryption key can be used for encrypting both memory and storage. In addition, it simplifies the choice of the IVs by since said IVs comprise random numbers instead of depending on the address of each data page, avoiding caching/buffering overloads. It further allows working with asynchronous/execute out-of-order operations by relying on cache lines being written in a random order, thus the IVs do not need to be related to the position cache lines on a memory page.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed:

1. A method comprising:
receiving, by a processor on an Integrated Circuit (IC) of a computing device, plaintext data;
determining, by the processor based on a selector indication associated with the plaintext data, whether the plaintext data is to be sent to a memory in the computing device or to an Input/Output (I/O) device, wherein a first value of the selector indication indicates that the plaintext data is to be sent to the memory, and a second value of the selector indication indicates that the plaintext data is to be sent to the I/O device; and
in response to determining based on the selector indication that the plaintext data is to be sent to the I/O device:
selecting, by the processor, a first technique from different techniques for generating an initialization vector, the different techniques comprising the first technique to use a random number in the initialization vector, and a second technique to use an address in the initialization vector, and
applying, by the processor an encryption primitive of a block cipher encryption algorithm to the plaintext data to create output encrypted data, wherein the initialization vector that comprises the random number is applied to the encryption primitive; and
generating a page in the memory of the computing device, the page comprising a data subpage storing the output encrypted data, and a metadata subpage storing the initialization vector.

2. The method of claim 1, comprising:
in response to determining based on the selector indication that the plaintext data is to be sent to the memory:
selecting, by the processor, the second technique that uses the address in the initialization vector, wherein the address is an address of the plaintext data, and
applying, by the processor, the encryption primitive to the plaintext data to create output encrypted data, wherein the initialization vector that comprises the address is applied to the encryption primitive.

3. The method of claim 1, wherein the selector indication comprises a selector bit settable to the first value or the second value.

4. The method of claim 1, comprising:
receiving, by the IC, a request to write the plaintext data to the I/O device, wherein the determining, the selecting, and the applying are performed in response to the request;
storing, by the processor, the output encrypted data into a respective address of the memory; and
sending, by the processor, a writing request to the I/O device including the respective address, to cause the I/O device to copy the output encrypted data from the memory to the I/O device.

5. The method of claim 4, wherein the copying of the output encrypted data from the memory to the I/O device is part of a Direct Memory Access operation of the I/O device.

6. The method of claim 1, comprising receiving, by the block cipher encryption algorithm, an encryption key that in combination with the initialization vector determines a functional output of the encryption primitive.

7. The method of claim 1, comprising:
generating, by the processor, an authentication tag for the output encrypted data; and
using the authentication tag to verify the output encrypted data during a decryption process.

8. The method of claim 7, wherein the metadata subpage further includes the authentication tag.

9. The method of claim 1, comprising generating the random number by a random number generator on the IC.

10. The method of claim 1, comprising generating the random number by:
generating, in a True Random Number Generator (TRNG) of the IC, a random seed;
seeding a Pseudo Random Number Generator (PRNG) of the IC with the random seed; and
generating, in the PRNG, the random number based on the random seed.

11. The method of claim 1, comprising:
obtaining, by the processor, the output encrypted data; and
applying, by the processor, a decryption primitive of the block cipher encryption algorithm to the output encrypted data to create output plaintext data, wherein the initialization vector comprising the random number is applied to the decryption primitive.

12. The method of claim 11, comprising:
sending, by the IC, a reading request to the I/O device for the output encrypted data that contains a respective address of the memory of the computing device to store the output encrypted data, to cause copying, by the I/O device, of the output encrypted data into the respective address of the memory; and
decrypting, by the processor, the output encrypted data by applying the decryption primitive to the output encrypted data copied by the I/O device.

13. A non-transitory machine-readable storage medium comprising instructions executable by an Integrated Circuit (IC) in a computing device to:
receive plaintext data;
determine, based on a selector indication associated with the plaintext data, whether the plaintext data is to be sent to a memory in the computing device or to an Input/Output (I/O) device, wherein a first value of the selector indication indicates that the plaintext data is to be sent to the memory, and a second value of the selector indication indicates that the plaintext data is to be sent to the I/O device;
in response to determining based on the selector indication that the plaintext data is to be sent to the I/O device:
select a first technique from different techniques for generating an initialization vector, the different techniques comprising the first technique to use a random number in the initialization vector, and a second technique to use an address of the plaintext data in the initialization vector,
apply an encryption primitive of an authenticated block cipher encryption algorithm to the plaintext data to create output encrypted data, wherein the initialization vector comprising the random number is applied to the encryption primitive, and
generate an authentication tag for the output encrypted data; and
generate a page in the memory of the computing device, the page comprising a data subpage storing the output encrypted data, and a metadata subpage storing the initialization vector.

14. The non-transitory machine-readable storage medium of claim 13, wherein the instructions are executable by the IC to:
in response to determining based on the selector indication that the plaintext data is to be sent to the memory:
select the second technique that uses the address in the initialization vector, and
apply the encryption primitive to the plaintext data to create output encrypted data, wherein the initialization vector that comprises the address is applied to the encryption primitive.

15. The non-transitory machine-readable storage medium of claim 13, wherein the metadata subpage is further to store the authentication tag.

16. A method comprising:
receiving, by a processor on an Integrated Circuit (IC) of a computing device, plaintext data;
determining, by the processor based on a selector indication associated with the plaintext data, whether the plaintext data is to be sent to a memory in the computing device or to an Input/Output (I/O) device, wherein a first value of the selector indication indicates that the plaintext data is to be sent to the memory, and a second value of the selector indication indicates that the plaintext data is to be sent to the I/O device; and
in response to determining based on the selector indication that the plaintext data is to be sent to the I/O device:
selecting, by the processor, a first technique from different techniques for generating an initialization vector, the different techniques comprising the first technique to use a random number in the initialization vector, and a second technique to use an address in the initialization vector, and
applying, by the processor an encryption primitive of a block cipher encryption algorithm to the plaintext data to create output encrypted data, wherein the initialization vector that comprises the random number is applied to the encryption primitive;
receiving, by the IC, a request to write the plaintext data to the I/O device, wherein the determining, the selecting, and the applying are performed in response to the request;

storing, by the processor, the output encrypted data into a respective address of the memory; and sending, by the processor, a writing request to the I/O device including the respective address, to cause the I/O device to copy the output encrypted data from the memory to the I/O device.

17. The method of claim 16, wherein the copying of the output encrypted data from the memory to the I/O device is part of a Direct Memory Access operation of the I/O device.

\* \* \* \* \*